United States Patent [19]
de Groot

[11] Patent Number: 5,995,224
[45] Date of Patent: Nov. 30, 1999

[54] FULL-FIELD GEOMETRICALLY-DESENSITIZED INTERFEROMETER EMPLOYING DIFFRACTIVE AND CONVENTIONAL OPTICS

[75] Inventor: Peter de Groot, Middletown, Conn.

[73] Assignee: Zygo Corporation, Middlefield, Conn.

[21] Appl. No.: 09/014,663

[22] Filed: Jan. 28, 1998

[51] Int. Cl.$^6$ ...................................................... G01B 9/02
[52] U.S. Cl. ............................................ 356/355; 356/359
[58] Field of Search .................................... 356/354, 355, 356/359, 360; 250/559.22, 237 G

[56] References Cited

U.S. PATENT DOCUMENTS

| | | |
|---|---|---|
| 3,958,884 | 5/1976 | Smith . |
| 4,498,771 | 2/1985 | Makosch et al. ....................... 356/351 |
| 4,714,348 | 12/1987 | MaKosch ................................. 356/351 |
| 5,526,116 | 6/1996 | de Groot ................................. 356/354 |
| 5,568,256 | 10/1996 | Korner et al. . |
| 5,598,265 | 1/1997 | de Groot ................................. 356/360 |
| 5,761,050 | 9/1997 | de Groot ................................. 356/359 |

OTHER PUBLICATIONS

Long Wavelength Laser Diode Interferometer for Surface Flatness Measurement, SPIE vol. 2248, pp. 136–140, Peter de Groot.

Grating Interferometer for Flatness Testing, Peter de Groot, Optics Letters, vol. 21, No. 3, pp. 228–230.

Equivalent–Wavelength Interferometry Using Diffractive Optics, Peter de Groot, SPIE, pp. 446–454.

*Primary Examiner*—Samuel A. Turner
*Attorney, Agent, or Firm*—Fish & Richardson P.C.

[57] ABSTRACT

A full-field, geometrically-desensitized interferometer (GDI) instrument incorporates a combination of diffractive optics and conventional optics to perform beam splitting and recombining operations during a surface profilometry operation. Symmetrically-positioned inbound and outbound optical subassemblies typically are arranged to direct an inbound collimated beam from a light generator to the profiled surface of a test object and to direct outbound reflected beams to an imaging device as a single recombined outbound interference beam. The optical path difference between the two inbound beams or between the two reflected outbound beams can be substantially independent of field position on a perfectly flat sampled surface adjusted for null fringes—hence producing the desired full-field effect. The resultant instrument, in addition to being capable of full-field imaging, exhibits several advantages when compared to grating-based GDI instruments including 1) a larger working distance, 2) the employment of readily-available blazed diffraction gratings or the like, and 3) the ability to transmit light with higher efficiency and without producing ghost images.

50 Claims, 2 Drawing Sheets

FULL-FIELD GEOMETRICALLY-DESENSITIZED INTERFEROMETER EMPLOYING DIFFRACTIVE AND CONVENTIONAL OPTICS

BACKGROUND OF THE INVENTION

1. Field of the Invention

The invention relates to interferometers and, more particularly, relates to a geometrically-desensitized interferometer (GDI) instrument for surface profiling. Even more particularly, the invention relates to a full-field GDI instrument combining diffractive optics and conventional optics to perform beam splitting and beam recombining operations. The invention additionally relates to a method of surface profiling using a full-field GDI instrument.

2. Discussion of the Related Art

Optical metrology of surface profiles can generally be divided into two regimes, namely interferometric and geometric. Geometric techniques include triangulation and moire fringe analysis, which involves the projection and imaging of a periodic structure such as a ronchi ruling. Geometric techniques are relatively insensitive to surface roughness and deformations, but are of relatively low resolution—so low, in fact, that they are unsuitable for many applications in which surface profiles must be measured with high precision.

Interferometry, on the other hand, relies on the wave nature of light to ascertain with high precision the surface profile of a test object. A typical traditional interferometer includes a light generator that generates a beam of light, a spatial filter-beam diverger that diverts the light beam into a diverging spherical wavefront, a beam splitter that diverts part of the diverging spherical wavefront from the filtered beam, and a collimating lens that collimates the wavefront to produce a piano wavefront of coherent light. This wavefront of coherent light is then reflected off test and reference surfaces to produce first and second reflected wavefronts which combine with one another while interfering both constructively and destructively to produce an interference fringe pattern. An imaging device such as a solid state camera receives the recombined wavefronts and acquires images of the interference fringe pattern. The interference fringe pattern then is analyzed to obtain information about the surface profile of the test object.

Fringe pattern analysis for surface profilometery often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., $1/100$) of the optical wavelength of the light source used to conduct the measurement. A second advantage of PSI is that it has good vibration immunity characteristics because phase data is acquired for all pixels simultaneously and because the data acquisition time is relatively short.

Generally speaking, however, conventional PSI approaches can only profile smooth surfaces having relatively small height variations or "surface departures" between adjacent measurement sites. This constraint results from the fact that PSI has a phase ambiguity constraint. Specifically, the maximum physical departure between adjacent measurement sites on the profiled surface must be less than $1/4$ of the source wavelength. Stated another way, the maximum phase difference between the reference and test light beams must have an absolute value which is less than $\pi$. This constraint, sometimes known as "two $\pi$ ambiguity", arises because the arctangent function, which is used to convert phase to distance, is only unique within the range of $\pm\pi$. Thus, although the use of phase measurements advantageously allows very high precision to be obtained, it disadvantageously limits the maximum surface departure between adjacent measurement sites to one quarter of the source's optical wavelength. A further difficulty with PSI arises when the surface slope is so large that it becomes difficult to resolve or distinguish the interference fringes because the fringe density is too high. Therefore, while PSI interferometetry is much more precise than geometric optical profilometery, it historically has been considered to be ill-suited for use with rough objects or objects having marked surface deformations. Interferometers using PSI analysis therefore historically have not been considered appropriate for some surface profilometery applications.

One interferometric technique that lacks the quarter-wavelength constraint of PSI is the so-called scanning white light interferometry or SWLI. In SWLI, a white light illumination source or, more generally, one which is of a broad-band as opposed to being of a narrow-band, generates an interference pattern which contains regions of high contrast for each location on the test surface as a function of scan position. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

However, SWLI has disadvantages of its own that hinders its use in industrial applications. For instance, the field of view is generally no larger than can be accommodated by standard microscope objectives. To function correctly, the imaging device of the instrument must have high resolution when compared to the corresponding interference fringe density. When the field of view of the typical SWLI instrument is increased, the fringe density can easily become difficult to resolve even with very high resolution imaging devices. This problem is especially evident during the profiling of rough surfaces. Moreover, slope tolerance for specular surfaces decreases linearly with the field size, and the speckle effects required for rough-surface measurements are only resolvable if the numerical aperture (NA) of the objective decreases linearly as the field increases. The need to resolve the speckle pattern from rough surfaces is the most discouraging, since the amount of collected light decreases with the square of the NA. The light loss means that larger surfaces require a more powerful illuminator. Worse, the fringe contrast is now a highly variable parameter, and the quality of the measurement depends critically on the balance between the reference and object beam intensities.

Another disadvantage of typical SWLI techniques is that data acquisition is very slow. The slow speed is a consequence of the large amount of data which must be acquired given the rapidly varying interference effect as a function of scan position. Accurate measurements require that these variations be recorded in detail, usually at the rate of one measurement per pixel per 75 nm of scan motion. The slow speed creates additional problems such as a high sensitivity to thermal distortions and mechanical strain during measurement.

Still another disadvantage of typical SWLI is its high sensitivity to vibration, which is due in part to the slow data acquisition speed, and in part to the extremely high sensitivity of the interference fringe pattern, which is easily corrupted by very small amounts of vibration. An instrument configured for SWLI analysis generally requires massive mounting fixtures and expensive vibration isolation. Even with these precautions, such instruments are still restricted to relatively vibration-free environments as compared to normal production environments.

Recent years have seen an increased demand for the high speed, high precision metrology of the surface profiles of manufactured parts having large surface departures, i.e., having rough surfaces or surfaces with pronounced surface deformations. A corresponding demand has arisen for the acquisition of data during production as opposed to in the laboratory. For instance, precision products such as hard disks for computer disk drives need to be profiled with high precision, at high speeds, and under conditions in which the test object may be subjected to substantial vibrations during manufacturing processes. Neither traditional PSI techniques nor traditional SWLI techniques are suitable for these purposes. A need therefore has developed for a "desensitized" interferometer that is relatively insensitive to surface roughness and surface deformations, that performs surface metrology with high accuracy and at high speeds, and that is relatively insensitive to vibrations and therefore is well-suited to production-line use.

This need has been met to a large extent by the development of the geometrically-desensitized interferometer (GDI) instrument. A GDI instrument is characterized by the replacement of the beam splitter of the traditional instrument with an optical assembly located between the collimating lens and the test object. The optical assembly, divides the collimated source light into two beams which propagate in two different directions and impinge on the profiled surface at the same location but at different incident angles. The beams reflect from the profiled surface and pass back through the optical assembly in different directions, after which they are recombined. Constructive and destructive interference of the reflected and recombined beams form an interference fringe pattern having an equivalent wavelength $\Lambda$ that may be orders of magnitude larger than the source wavelength. As a result, the GDI instrument is much less sensitive to height variations and surface deformations than are traditional interferometers using PSI analysis techniques.

Some forms of GDI instruments also are achromatic. That is, the fringe spacing in an interference fringe pattern produced by a GDI instrument is independent of the source wavelength. As a result, and unlike with SWLI interferometers, there is no coherence envelope associated with the source bandwidth. Many disadvantages associated with SWLI such as a limited field of view, a slow acquisition speed, and a high sensitivity to vibration therefore are avoided. The sensitivity of GDI instruments is intermediate conventional interferometry and moiré fringe analysis, and is comparable to that obtained with grazing-incidence interferometry. GDI instruments therefore can be used in manufacturing applications and other applications that are unsuitable for traditional interferometry.

The two best-known types of GDI instruments are grating-based and conventional optics-based, respectively. The characteristics and limitations of each type of instrument will now be briefly described.

A grating-based GDI instrument is characterized by the use of at least one (and usually two) diffractive gratings that perform all of the beam splitting and beam recombining operations of the instrument. An exemplary grating-based GDI instrument is disclosed in U.S. Pat. No. 5,526,116 to de Groot (the de Groot '116 patent). Specifically, FIG. 2 of the de Groot '116 patent illustrates a diffractive optical assembly that includes first and second parallel linear phase gratings spaced from one another in the Z direction of the instrument. The second grating is not strictly required but produces the advantage of permitting the working distance between the exit surface of the grating assembly and the profiled surface of the test object to be increased from zero to a somewhat larger distance—typically about 2 inches. Both gratings are involved in both the splitting of an inbound beam and in the recombining of reflected beams from the object surface. Specifically, the first grating diffracts an inbound collimated beam from a light source into two first-order beams "A" and "B". The beams A and B are then redirected by the second grating so that they impinge on the profiled surface of the object at the same location but at different incident angles $\alpha$ and $\beta$. Reflected beams A' and B' propagate outwardly from the profiled surface at corresponding angles $\alpha'$ and $\beta'$ and travel back through the second and first gratings sequentially so as to recombine with constructive and destructive interference. The recombined interfering beams or wavefronts are then imaged by an imaging device to display an interference pattern representative of the profile of the imaged surface. Typically, the interference pattern provides for each point on the imaged object surface an interference phase that is substantially linearly proportional to the local surface height.

The typical grating-based GDI instrument exhibits all of the above-described advantages of GDI instruments. Moreover, because it only requires two optical devices to split and recombine the inbound and outbound beams, it is relatively compact, relatively easy to align and maintain its alignment, and has a relatively small sensitivity to air turbulence. Moreover, it constitutes a true full-field GDI instrument. A "full-field" instrument is one in which the optical path difference between the two inbound beams A and B (or between the two outbound beams A' and B') is substantially independent of field position on a perfectly smooth sample surface the orientation of which relative to the instrument is adjusted to produce null fringes when it is imaged. The full-field capability of grating-based instruments arises from the fact that the gratings permit a change of direction of the beam without actually tilting the gratings relative to one another. The basic geometry of a full-field instrument is substantially unchanged with either side-to-side or fore-to-aft object tilt and, accordingly, provides a substantially linear and uniform response to surface topography over the entire imaged area of the object surface. In contrast, an instrument that is not capable of full-field imaging provides a substantially linear and uniform response only at a single point or along a single line of the imaged object surface.

Grating-based GDI instruments have some limitations arising from the fact that all beam splitting and recombining operations are performed via the same phase grating(s). For instance, they have a relatively small working distance (defined as the distance between the second grating and the profiled surface) that varies generally directly with the distance between the first and second gratings. For example, a grating-based GDI instrument employing currentlyavailable phase gratings generally has a maximum working distance of about 2". This working distance is sufficiently large for most laboratory applications. However, it is insufficiently large for some industrial applications in which the test object is located in an environment that is hostile to the instrument and/or is separated from the instrument, e.g., by a transparent wall. These applications include profiling an object in an oven or profiling an object in a processing chamber.

Another limitation of the typical grating-based GDI instrument is that it requires the use of relatively expensive and difficult-to-obtain phase gratings. Phase gratings or their functional equivalents are required because these same gratings both 1) split inbound beams to form the converging impinging beams and 2) recombine reflected outbound beams to form the outbound interference beam. Stated another way, the gratings must be capable of accommodating both positive diffraction orders and negative diffraction orders with sufficient transmission efficiency to produce acceptable interference fringes using commercially-available light sources and imaging devices. Phase gratings meeting these requirements are relatively difficult to obtain and cost about twice as much as comparable reflective gratings designed for light impingement on one surface only. Moreover, the basic geometry of the typical grating-based GDI instrument precludes blazing the phase grating to enhance its transmission efficiency.

Conventional optics-based GDI instruments rely on beam splitters, lenses, mirrors, and/or other conventional optical elements to split and recombine beams. GDI instruments of this type are disclosed, e.g., in U.S. Pat. No. 3,958,884 to Smith (the Smith patent) and U.S. Pat. No. 4,714,348 to Makosch (the Makosch patent). For instance, the instrument illustrated in FIG. 6 of the Makosch patent employs a beam splitter and a plurality of mirrors to generate three collimated beams that are brought to interference in a symmetrical light field. When an object surface is brought into this light field, reflected beams are transmitted back through the system of splitters and mirrors and are recombined to form an interference pattern representative of the profile of the imaged surface. Conventional optics-based GDI instruments have the advantage of not requiring phase gratings and hence tend to exhibit a larger working distance than grating-based instruments. For small objects, they also may be less expensive to manufacture than grating-based GDI instruments to the extent that they employ more readily available optics than the phase gratings employed by grating-based GDI instruments.

However, conventional optics-based GDI instruments have at least one very serious limitation that severely limits their practical range of applications. That is, unlike grating-based instruments, conventional optics-based GDI instruments do not have full-field capability. This limitation arises from the fact that the field-independent path difference condition of a full-field instrument is not fulfilled by the mirrors or other conventional optical elements typically used in conventional optics-based GDI instruments. Conventional optical elements cannot be positioned in parallel with one another and still produce beams that overlap on the object surface at two different angles of incidence. Hence, in the Makosch patent, the inbound beams exhibit a first OPD at one field position on the object surface as illustrated in FIG. 6 of the Makosch patent and exhibit a different OPD at a different field position, even if the object surface is perfectly flat. Depending on the manner in which interference data is acquired and interpreted, the actual field of view of the typical conventional optics-based GDI instrument may therefore constitute no more than a point on the object surface relative to the instrument or, at best, a line extending along the object surface. Therefore, conventional optics-based instruments generally are limited to single-point profiling or, at best, linear profiling. This extremely limited field of view is unacceptable for most applications.

A need therefore has arisen to provide a GDI instrument that has full-field imaging capability but that lacks the limitations of grating-based GDI instruments.

OBJECTS AND SUMMARY OF THE INVENTION

It is therefore a principal object of the invention to provide a full-field GDI instrument that does not require transmissive phase gratings to split and recombine beams propagating to and from the profiled surface.

Another object of the invention is to provide a full-field GDI instrument that has a relatively large working distance when compared to known embodiments of grating-based GDI.

Still another object of the invention is to provide an improved method for the full-field imaging of an object surface using a GDI instrument.

In accordance with a first aspect of the invention, these objects are achieved by providing an interferometer comprising a light generator, and an optical assembly which is disposed between the light generator and the object surface and which includes a conventional optical element and a diffractive optical device. The optical assembly is arranged to 1) divide light received from the light generator into first and second impinging beams which a) propagate in two different directions, b) impinge upon the object surface at essentially the same location but at different incident angles, and c) exhibit an optical path difference therebetween that can be at least substantially independent of field position, and to 2) recombine first and second reflected beams propagating from the object surface to form an interference pattern representative of a profile of the object surface.

The instrument may employ a high-coherence light source such as a gas laser, a solid state laser, a laser diode or the like, in which case the optical assembly may be configured such that the first and second impinging beams travel substantially different distances from the beam splitter to the object surface. In this event, the conventional optical element (typically comprising a beam splitter) is arranged to 1) receive a beam from the light generator, 2) split the received beam into a) a transmitted beam forming the first impinging beam and b) a reflected beam forming the second impinging beam, and 3) transmit the first impinging beam to the object surface without additional reflection of the first impinging beam. The diffractive optical device is arranged to 1) receive the second impinging beam from the beam splitter or similar element, and 2) transmit the second impinging beam to the object surface without additional reflection of the second impinging beam.

Alternatively, the instrument may employ a low-coherence light source such as an LED, a multimode diode laser or a filtered incandescent bulb. In this case, the optical assembly should be configured such that the first and second impinging beams travel essentially the same distance from the beam splitter to the object surface. The conventional optical element preferably comprises a beam splitter which is arranged to 1) receive a beam from the light generator, and 2) split the received beam into a) a reflected beam forming a first impinging beam and b) a transmitted beam forming a second impinging beam. The optical assembly preferably further comprises 1) a first reflective device which is arranged to a) receive the first impinging beam from the beam splitter, and b) direct the first impinging beam onto the object surface without additional reflection of the first impinging beam, and 2) a second reflective device which is arranged to receive the second impinging beam from the beam splitter and to deflect the second impinging beam. The diffractive optical device is arranged to a) receive the second impinging beam from the second reflective device, and b) direct the second impinging beam onto the object surface without additional reflection of the second impinging beam.

In order to permit PSI analysis of the acquired data, a phase shifter preferably is incorporated into the instrument to induce a periodic phase shift in light traveling through the optical assembly. The phase shifter is preferably coupled to a component of the optical assembly and is arranged to effect periodic movement of the component over a range typically of a few microns in extent. In order to permit longer scans for sectioning complex surface features, a scanning stage may, if desired, also be included to permit translation of the object with respect to the instrument.

Another object of the invention is to provide a method that meets the last aforementioned object and that permits the imaging of a surface that is located a relatively large distance from the instrument such as in an environment that is hostile to the instrument or that is inaccessible by the instrument.

In accordance with another aspect of the invention, these objects are achieved by generating a beam of light and transmitting the generated beam through an optical assembly which includes a conventional optical element and a diffractive optical device. The transmitting step includes dividing the generated beam into first and second impinging beams which a) propagate in two different directions, b) impinge upon the object surface at essentially the same location but at different incident angles, and c) exhibit an optical path difference therebetween that can be at least substantially independent of field position. A final step includes recombining first and second reflected beams propagating from the object surface to form an interference pattern representative of a profile of the object surface.

If the instrument employs a high-coherence light source, the first and second impinging beams may travel substantially different distances from the beam splitter to the object surface. In this case, the transmitting step preferably includes 1) directing the generated beam from the light generator to a beam splitter forming the conventional optical element, 2) splitting the generated beam, using the beam splitter, to form a) a transmitted beam forming the first impinging beam and b) a reflected beam forming the second impinging beam, 3) directing the first impinging beam from the beam splitter to the object surface without additional reflection of the first impinging beam, 4) directing the second impinging beam from the beam splitter to the diffractive optical device, and 5) directing the second impinging beam from the diffractive optical device to the object surface without additional reflection of the second impinging beam.

If the instrument employs a low-coherence light source, the first and second impinging beams should travel essentially the same distance from the beam splitter to the object surface. In this case, the transmitting step preferably comprises 1) directing the generated beam from the light generator to a beam splitter forming the conventional optical element, 2) splitting the generated beam, using the beam splitter, to form a) a reflected beam forming the first impinging beam and b) a transmitted beam forming the second impinging beam, 3) directing the first impinging beam to a first reflective device, 4) directing the first impinging beam from the first reflective device and onto the object surface without additional reflection of the first impinging beam, 5) directing the second impinging beam to a second reflective device, 6) directing the second impinging beam from the second reflected device to a diffractive optical device which is parallel to the second reflective device, and 7) directing the second impinging beam from the diffractive optical device and onto the object surface without additional reflection of the second impinging beam.

Preferably, in order to permit PSI analysis of acquired data, a periodic phase shift is induced in light traveling through the optical assembly. The inducing step preferably comprises effecting periodic movement of a component of the optical assembly. If desired, a scanning stage may also be provided to move the object with respect to the instrument over larger ranges.

Other object, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

Figure 1:
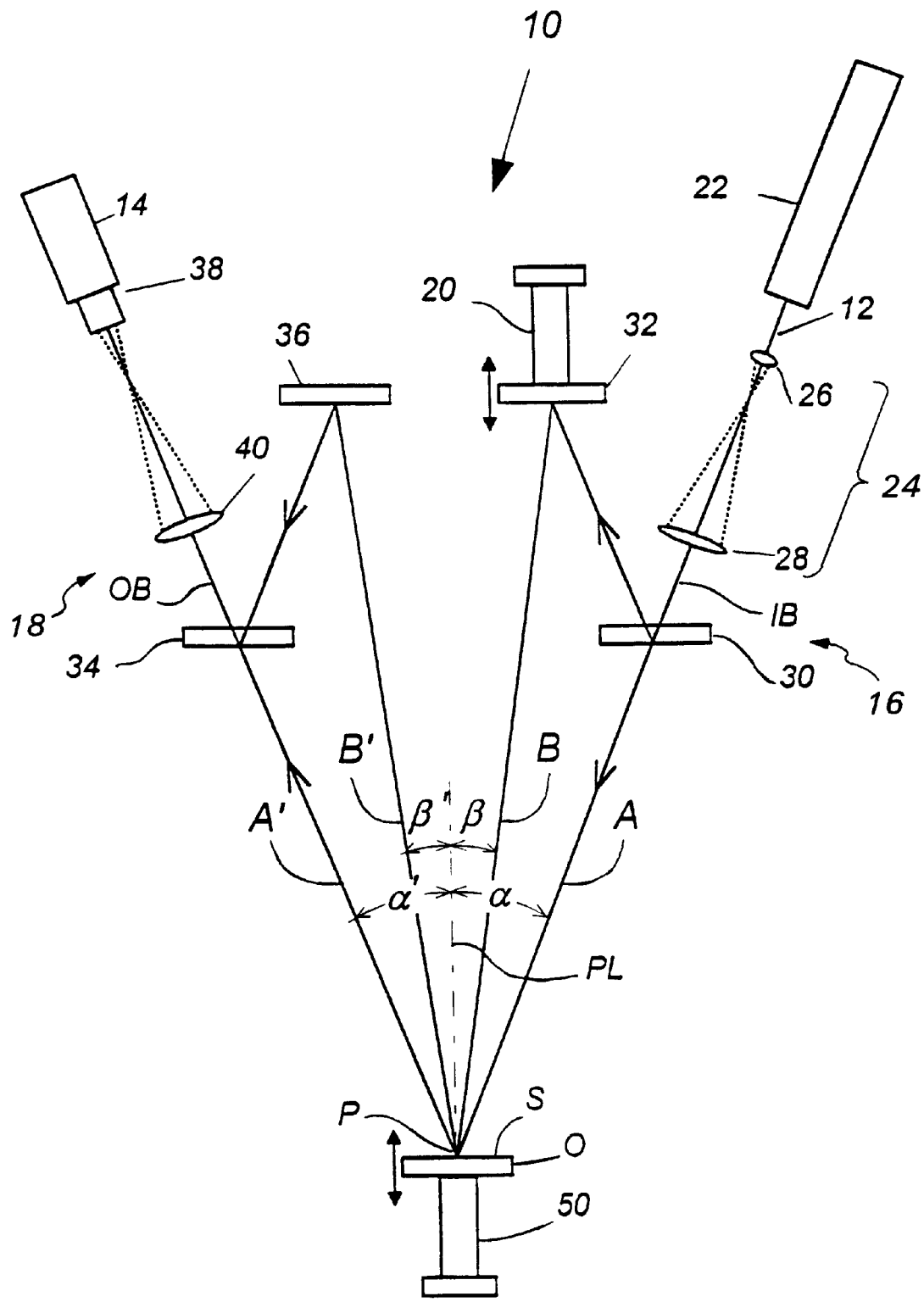
FIG. 1 schematically illustrates a full-field, geometrically-desensitized interferometer (GDI) instrument constructed in accordance with a first preferred embodiment of the present invention.

A full-field, geometrically-desensitized interferometer (GDI) instrument incorporates a combination of diffractive optics and conventional optics to perform beam splitting and recombining operations during a surface profilelomotry operation. Symmetrically-positioned inbound and outbound optical subassemblies typically are arranged to direct an inbound collimated beam from a light generator to the profiled surface of a test object and to direct outbound reflected beams to an imaging device as a single recombined outbound interference beam. The optical path difference between the two inbound beams or between the two reflected outbound beams can be substantially independent of field position on a perfectly flat sampled surface adjusted for null fringes—hence producing the desired full-field effect. The resultant instrument, in addition to being capable of full-field imaging, exhibits several advantages when compared to grating-based GDI instruments including 1) a larger working distance, 2) the employment of readily-available blazed diffraction gratings or the like, and 3) the ability to transmit light with higher efficiency and without producing ghost images.

2. Full-Field GDI Instrument Overview

At the core of the invention is the realization that a full-field GDI instrument can be produced without relying exclusively on gratings for the splitting and recombining of inbound and outbound light beams or wavefronts propagating to and from a profiled surface S of a test object O. Rather, both inbound and outbound optical subassemblies of the instrument employ a combination of conventional optical elements and diffractive optical devices. "Diffractive optical devices" use diffraction to control wavefronts. Diffractive optical devices include diffraction gratings, surface-relief diffractive lenses such as Fresnel lenses, holographic optical elements, and computer-generated holograms. Methods of fabricating diffractive optical devices include diamond machining, coherent beam interfacing (holography), injection molding, and advanced microlithographic techniques. "Conventional optical elements", on the other hand, include 1) refractive optical elements, such as lenses, prisms, and birefringent beam splitters and 2) reflective optical elements, such as mirrors and plate beam splitters.

More specifically, the inbound optical subassembly splits an inbound substantially collimated beam into two spatially-distinct first order beams A and B that impinge on a point P of the object surface S at the same location but at different angles of incidence α and β relative to a plane PL that bisects the optical assembly and that separates the inbound and outbound optical subassemblies from one another. Corresponding first order beams A' and B' are reflected from the point P on the surface S at corresponding angles α' and β' and are recombined by the outbound optical subassembly to produce a single interference beam which is then imaged by the imaging device to display an interference pattern which is representative of the profiled surface S. The outbound interference beam has an equivalent wavelength Λ that is a function of the incident angels α and β, substantially according to the formula:

$$\Lambda = \frac{\lambda}{\cos(\beta) - \cos(\alpha)}$$

The conventional optical element(s) of each optical subassembly preferably includes a beam splitter (such as a plate splitter or a birefringent crystal), and the diffractive optical device(s) of each optical subassembly preferably includes a reflective grating, a hologram, or the like. Each diffractive optical device preferably is arranged in parallel with an adjacent conventional optical device so that the optical path difference (OPD) between inbound beams or between outbound beams can be substantially independent of field position. The ability to fulfill this field-position independence condition is generally considered to be required for full-field imaging capability. It should be noted, however, that true field-position independence only occurs on a perfectly flat surface the orientation of which relative to the instrument is adjusted for null fringes. Hence, reference herein to an OPD that "can be substantially independent of field position" should be understood to mean an OPD that is substantially independent of field position on a perfectly flat surface the orientation of which relative to the instrument is adjusted to produce null fringes when imaged. An OPD is considered substantially independent of field position even though the OPD is not substantially independent of field position when the measured surface is not perfectly flat or when the orientation of the measured surface is not adjusted to produce null fringes when imaged.

By way of explanation only, two embodiments are disclosed herein in which the optics of the first embodiment are configured to work in conjunction with a high-coherence light source and the optics of the second embodiment are configured to work with a low-coherence or spatially extended light source. It should be understood that the optics of these embodiments could be supplemented with other optics, replaced with other optics performing the same or equivalent functions, and/or mixed and matched in any desired manner.

3. Construction and Operation of First Embodiment

Referring now to FIG. 1, a full-field GDI instrument 10 is schematically illustrated that is constructed in accordance with a first preferred embodiment of the invention and that is arranged to profile a surface S of a test object O. The instrument 10 includes a light generator 12, an imaging device 14, and an optical assembly including first and second subassemblies 16 and 18 positioned symmetrically about opposite sides of a plane PL which bisects the optical assembly. The first optical subassembly 16 acts upon light traveling inbound towards the profiled surface S of the object O from the light generator 12 and, accordingly, will henceforth be referred to as the "inbound optical subassembly." The second optical subassembly 18 acts upon reflected light propagating outwardly from the profiled surface S of the object O towards the imaging device 14 and, accordingly, will henceforth be referred to as the "outbound optical subassembly." A phase shifter 20 is also provided to permit PSI analysis as discussed below. A scanning stage 50 may, if desired, also be included to permit translation of the object with respect to the instrument for depth scanning or other purposes.

The light generator 12 includes a light source 22 and a beam expander 24. The light source 22 may comprise any high-coherence light source capable of producing a substantially collimated light beam when used in conjunction with the beam expander 24. The light source 22 preferably comprises a high-coherence laser such as a gas (e.g. helium neon) laser, a solid state laser, a laser diode or the like. A high-coherence light source is required in this embodiment because the optics are not of an equal path design, i.e., there is a non-zero OPD between the two impinging first order inbound beams A and B and between the two corresponding reflected outbound beams A' and B'. Of course, as will become apparent from the second embodiment, a high-coherence light source is not required if the inbound and outbound optical subassemblies 116 and 118 are configured such that the OPD between the beams A and B and between the beams A' and B' is substantially zero.

The beam expander 24 is located between the output of the light source 22 and the input of the inbound optical subassembly 16. The beam expander 24 includes field and collimating lenses 26 and 28 which, as is known to those skilled in the art, produce a collimated output beam IB that is at least as large as the field or area on the object surface S that is intended to be illuminated and imaged.

The purpose of the inbound optical subassembly 16 is to 1) produce the aforementioned impinging beams A and B from the inbound beam IB from the light generator 12 and 2) fulfill the desired condition of field-independent path difference between the impinging beams A and B. In the illustrated embodiment in which the light generator 12 includes a high-coherence light source 22 and hence in which provision need not be made to produce a zero OPD between the beams A and B, the inbound optical subassembly 16 includes only a beam splitter 30 and a simple diffractive optical device 32.

The beam splitter 30 may comprise any conventional optical device or combination of optical devices that is arranged to 1) receive the inbound beam of light IB from the light generator 12 and 2) split the received beam into a) a transmitted beam forming the first impinging beam A and b) a reflected beam forming the second impinging beam B. The beam splitter 30 could, for instance, comprise any commercially-available plate-type beam splitter, a birefringent crystal, or some combination of these elements with additional conventional optics. While a plate-type beam splitter is acceptable for many applications, a birefringent crystal may be desirable in some other applications because such crystals divide the inbound beam IB based on its polarization state so that the reflected and transmitted beams each have a unique polarization state. A Wollaston prism is an example of an optical component comprising birefringent crystals usable for this purpose.

The diffractive optical device 32 is designed to receive the second impinging beam B reflected from the beam splitter 30 and to direct the beam B onto the point P of the object surface S. In order to produce an OPD between the beams A and B that is independent of field position and hence to meet the field position independence condition generally considered to be required for full-field imaging, the diffractive optical device 32 is parallel to the beam splitter 30 such that its zeroith order diffraction is parallel to the beam A. The diffractive optical device 32 also is arranged to produce at least one diffracted beam (typically a first order diffracted beam) forming the downstream leg of the impinging beam B. Diffractive optical devices suitable for these purposes include holograms and reflective gratings. The illustrated diffractive optical device 32 is a reflective grating having 300 gratings/mm. A reflective grating that is suitable for this purpose is commercially-available from Edmund Scientific at a relatively low cost. The reflective grating preferably is blazed to adjust the shape of its grooves in order to channel light preferentially into the diffraction order producing the beam B (typically the first order). Instead of (or in addition to) using a blazed grating as the grating serving as the diffractive optical device 32, an attenuating filter could be inserted into the path of the beam A to compensate for the light lost to the beam B during diffraction so that the net effect is the same, i.e., the beams A and B are of substantially the same intensity.

The outbound optical subassembly 18 preferably includes components that correspond to components of the inbound optical subassembly 16 and that are symmetrical about the plane PL with respect to the corresponding components of the inbound optical subassembly 16. Hence, in the illustrated embodiment, the outbound optical subassembly 18 includes a beam splitter 34 (such as a plate beam splitter or a birefringent crystal) and a diffractive optical device 36 (such as a reflective grating or a hologram). The diffractive optical device 36 is arranged to receive the second reflected beam B' from the object surface S and to deflect the beam B'. The beam splitter 34 is arranged to receive a) the first reflected beam A' from the object surface S and b) the deflected second reflected beam B' from the diffractive optical device 36. The beam splitter 34 is further arranged to recombine the first and second beams A' and B' to form an interfering outbound beam OB and to direct the outbound beam OB towards the imaging device 14. As with the corresponding components of the inbound optical subassembly 16, the beam splitter 34 and the diffractive optical device 36 are arranged in parallel with one another to fulfill the field-position independent OPD condition generally considered to be required for full-field imaging.

The imaging device 14 may comprise any suitable device capable of displaying an image of the interference pattern produced by the recombined outbound beam OB. This pattern could be displayed visually and witnessed by the naked eye. In the illustrated and preferred embodiment, however, the imaging device includes 1) a camera 38 and 2) a focusing lens 40 that directs the recombined interfering beam OB to the camera 38. The camera 38 preferably comprises a charge coupled device (CCD) of the type commonly used in interferometer applications.

The phase shifter 20 may comprise any device that induces a periodic phase difference between light received at two pixels of the imaging device 38 in order to permit analysis of the interference fringe patterns by PSI. Phase shifting preferably is achieved by varying the optical path of the test light beam during image acquisition. This variation is achieved in the illustrated embodiment by configuring the phase shifter 20 as a transducer that is coupled to the diffractive optical device 32 of the inbound optical subassembly 16 and that is controllable by a computer (not shown) to move the diffractive optical device 32 in the Z direction of the instrument 10 (or vertically in FIG. 1). Phase shifter 20 could alternatively be coupled to the diffractive optical device 36 of the outbound optical subassembly 18 or to another optical component of the GDI instrument 10. Phase shifter 20 also could be eliminated entirely if 1) the scanning stage 50 is capable of moving the object O so as to permit PSI analysis, 2) phase shifting were to be achieved by source wavelength modulation, or if 3) data analysis other than PSI were to be utilized.

The scanning stage 50 is disposed so as to support the Object O in the instrument 10 so as to selectively displace the object O in the Z direction of the instrument, for focusing purposes, for periodically moving the object to permit analysis of the acquired data by PSI analysis, and/or for the purpose of depth scanning. Depth scanning is detailed in U.S. Pat. No. 5,598,265 to P. de Groot, the subject matter of which is hereby incorporated by reference for its disclosure of depth scanning using a GDI instrument.

In operation, the high-coherence light source 22 of the GDI instrument 10 generates an inbound light beam IB which is collimated by the lens 28 of the beam expander 24 before impinging on the beam splitter 30 of the inbound optical subassembly 16. The beam splitter 30 splits the inbound collimated beam IB to form a) a transmitted beam that constitutes the first impinging beam A and b) a reflected beam that constitutes the second impinging beam B. The first impinging beam A is directed by the beam splitter 30 to the point P on the object surface S at an incident angle α without additional deflection thereof prior to its impingement. The second impinging beam B is directed from the beam splitter 30 to the diffractive optical device 32, which then directs the beam B to the point P on the object surface S at an incident angle β without additional deflection of the beam B.

The reflected beams A' and B' 1) propagate in essentially the reverse of the inbound beams A and B at corresponding angles α' and β' and 2) are acted upon by the diffractive optical device 36 and the beam splitter 34 of the outbound optical subassembly 18 to produce the aforementioned recombined output beam OB. Specifically, the second reflected beam B' is deflected by the diffractive optical device 36 towards the beam splitter 34. The beam splitter 34 receives the second reflected beam B' from the diffractive optical device as well as the first reflected beam A' and recombines the beams to produce a single interfering beam OB. The beam OB then is imaged by the imaging device 14 to display an interference pattern representative of the profile of the surface S.

It can hence be seen that the GDI instrument 10 is capable of full-field imaging without using any phase gratings or equivalent transmissive diffractive optical devices. The OPD between the inbound beams A and B and between the outbound beams A' and B' is at least substantially independent of field position (at least for a perfectly flat surface arranged for null fringes). The reflective gratings serving as the diffractive optical devices 32 and 36 are typically about one-half as expensive as phase gratings typically used in grating-based GDI instruments. The reflective gratings serving as the diffractive optical devices 32 and 36 also typically exhibit more efficient transmission than phase gratings used in grating-based GDI instruments—particularly if the gratings are blazed. This blazing also reduces or eliminates ghost images by channeling a high percentage of the diffracted light into the desired diffraction order. Moreover, because the working distance between the beam splitters 30 and 34 and the object surface S is strictly a function of the geometry of the optical subassemblies 16 and 18, the working distance can be set as long as necessary—up to several feet if required—simply by increasing the spacings between the various optical components 30, 32, 34 and 36.

Of course, other combinations of conventional and diffractive optics could be used to achieve the desired effect of a full-field GDI instrument. One illustrative example of an alternative arrangement will now be detailed.

4. Construction and Operation of Second Embodiment

Figure 2:
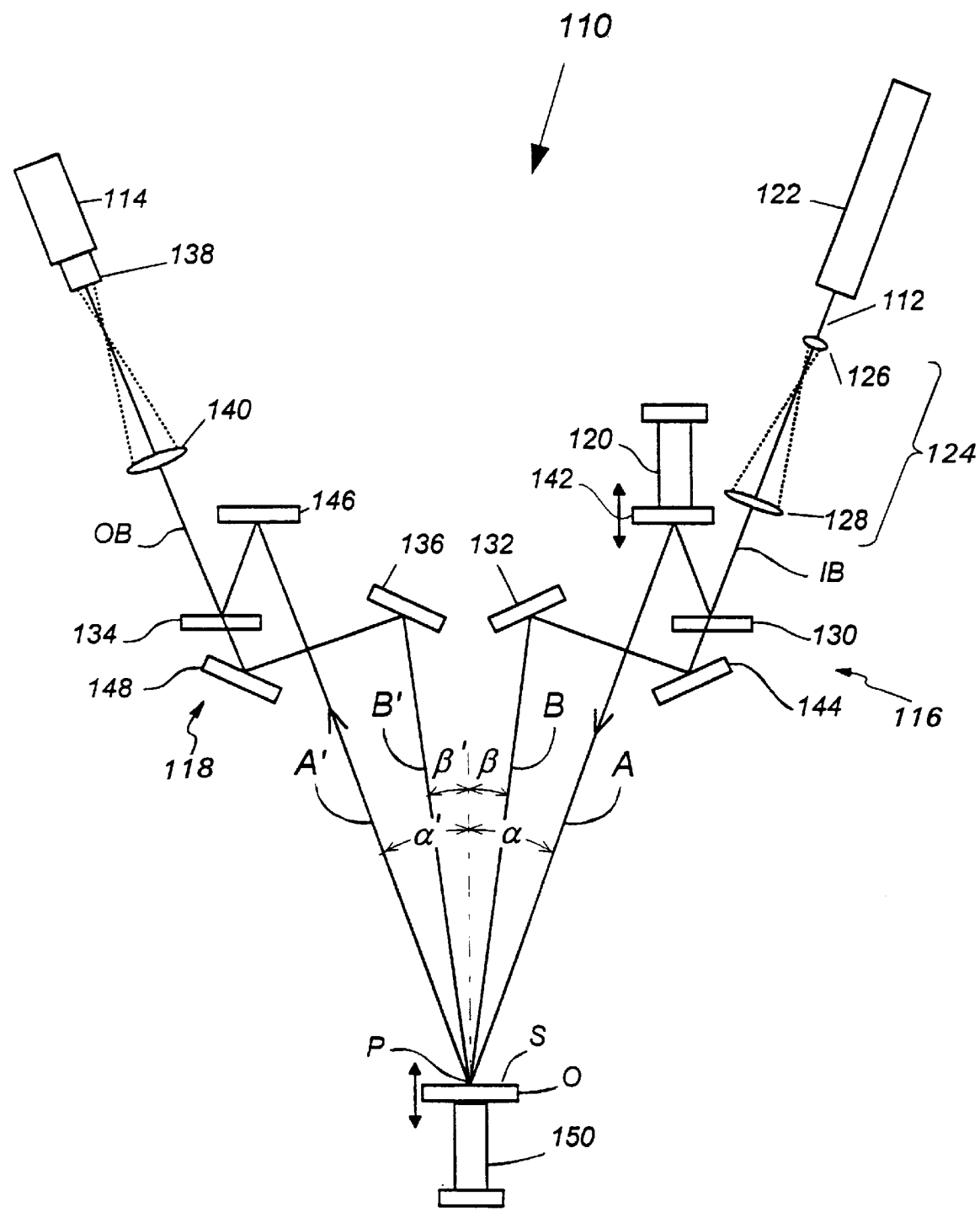
FIG. 2 schematically illustrates a full-field GDI instrument constructed in accordance with a second preferred embodiment of the invention.

Referring now to FIG. 2, a full-field GDI instrument 110 is illustrated that differs from the instrument 10 of the first embodiment only in that it is configured to employ as its light source 122 a spatially-extended low-coherence light source. Components of the GDI instrument 110 of the second embodiment that are the same as or analogous to components of the GDI instrument 10 of the first embodiment are denoted by the same reference numeral, incremented by 100. The instrument 110 therefore includes a light generator 112, an imaging device 114, inbound and outbound optical subassemblies 116 and 118, a phase shifter 120, and a scanning stage 150. Also as in the first embodiment, the inbound and outbound optical subassemblies 116 and 118 both include a beam splitter 130, 134 and a diffractive optical device 132, 136.

The light generator 112 comprises 1) a light source 122 and 2) a beam expander 124 including lenses 126 and 128. The light source 122 comprises a spatially-extended low-coherence light source such as an LED or a multi-mode diode laser.

The imaging device 114 is identical to the imaging device 14 of the first embodiment and, accordingly, comprises 1) a camera 138 such as a CCD and 2) a focusing lens 140.

In order to accommodate the low-coherence light source 122, the inbound and outbound optical subassemblies 116 and 118 are configured and arranged to produce an equal path design, i.e., to produce a design in which the distance traveled by the inbound impinging beams A and B or the outbound reflected beams A' and B' is substantially equal. Accordingly, the OPD between the beams A and B or between the beams A' and B' is approximately zero. Towards this end, in addition to including a beam splitter 130 or 134 and a diffractive optical device 132 or 136 of the type discussed above in conjunction with the first embodiment, each of the inbound and outbound optical subassemblies 116 and 118 additionally includes a first reflective device 142 or 146 and a second reflective device 144 or 148, respectively. Each of the reflective devices 142, 144, 146, and 148 could comprise one or more prisms or lenses but preferably comprises a simple flat mirror.

The first reflective device 142 of the inbound subassembly 116 is arranged to receive a first impinging beam A reflected from the beam splitter 130 and to direct the beam A onto the object surface S. The second reflective device 144 is arranged to receive the second impinging beam B transmitted through the beam splitter 130 and to deflect the beam B. The diffractive optical device 132 is arranged to receive the beam B from the first reflective device 144 and to direct the beam B onto the object surface S. Similarly, the first reflective device 146 of the outbound subassembly 118 is arranged to receive the reflected beam A' from the object surface S and to deflect the beam A' towards the beam splitter 134, and the second reflective device 148 is arranged to receive the deflected and reflected beam B' from the second diffractive optical device 136 and to additionally deflect this beam B' towards the beam splitter 134. The beam splitter 134 is arranged to recombine the beams A' and B' to produce an outbound interfering beam OB imageable by the imaging device 114.

The phase shifter 120 is identical to the phase shifter 20 of the first embodiment and, as in the first embodiment, may be connected to any optical device of either of the inbound optical subassembly 116 or the outbound optical subassembly 118. The illustrated phase shifter 120 is connected to the first reflective device 142 of the inbound optical subassembly 116.

The scanning stage 150 also is identical to the scanning stage 50 of the first embodiment. The scanning stage 150 therefore is operable to support the object O and to selectively effect movement of the object O in the Z direction of the instrument 110 for the purpose of focusing, depth scanning, and/or phase modulation.

In use, a beam of light IB is generated by the spatially-extended low-coherence light source 122 and is collimated by the lens 128 of the beam expander 124 before impinging upon the beam splitter 130 of the inbound optical subassembly 116. The beam splitter 130 splits the inbound collimated beam IB into first and second impinging beams A and B. The first impinging beam A is deflected by the reflective device 142 and then is directed to the sample surface S, where it impinges on the point P at an angle cc without additional reflection prior to its impingement. The second impinging beam B is transmitted through the beam splitter 130, is deflected by the reflective device 144, is deflected again by the diffractive optical device 132, and impinges on the point P of the object surface S at an angle β without additional reflection prior to its impingement. Reflected beams A' and B' propagate outwardly away from the point P towards the outbound optical subassembly 118 at respective angles α' and β'. The beam A' is reflected from the reflective device 146 and onto the beam splitter 134. The beam B' is deflected by the diffractive optical device 136, and deflected again by the reflective device 148 so as to impinge on and be transmitted through the beam splitter 134. The beams A' and B' are recombined by the beam splitter 134 to produce a single interfering output beam OB which is then focused by the focusing lens 140 and imaged by the camera 138 to display an interference image representative of the profile of the imaged surface.

The full-field GDI instrument 110 of the second embodiment exhibits all of the advantages of the full-field GDI instrument 10 of the first embodiment and can be considered fully interchangeable with the instrument 10 of the first embodiment depending upon the preferred light source.

Many other changes and modifications could be made to the invention in addition to those discussed above without departing from the spirit thereof. For instance, although the optical assembly of each preferred embodiment comprises distinct and non-overlapping inbound and outbound optical subassemblies, the optical assembly of the instrument could be arranged so that some of the optical devices or elements of the instrument act on both inbound beams and outbound beams. In addition, while the optics of the first and second embodiments constitute two-beam configurations designed to form and recombine two impinging and reflected beams, the invention also applies to three-beam configurations and even multi-beam configurations. The scope of other changes will become apparent from the appended claims.

I claim:

1. A geometrically-desensitized interferometer for profiling an object surface, said interferometer comprising:
    (A) a light generator; and
    (B) an optical assembly which is disposed between said light generator and the object surface, which includes a non-diffractive optical element and a diffractive optical device, and which is arranged to 1) divide light received from said light generator into first and second beams which a) propagate in two different directions, b) impinge upon the object surface at essentially the same location but at different incident angles, and c) then reflect off of the object surface and 2) recombine the first and second beams propagating from the object surface to form an interference pattern representative of a profile of the object surface, wherein the first beam follows a first path through the optical assembly, said first path contacting both the non-diffractive optical element and the diffractive optical device, wherein the second beam follows a second path through the optical assembly, said second path contacting the non-diffractive optical element and avoiding the diffractive optical device, and wherein the first and second paths meet at the non-diffractive optical element.

2. An interferometer as defined in claim 1, wherein said non-diffractive element is at a location along each of the first and second paths that is before the object surface and wherein said optical assembly is configured such that the first and second beams travel substantially different distances from said non-diffractive optical element to the object surface.

3. An interferometer as defined in claim 2, wherein
    said non-diffractive optical element comprises a beam splitter which is arranged to 1) receive a beam from said light generator, 2) split the received beam into a) a transmitted beam forming the first beam and b) a reflected beam forming the second beam, and 3) transmit the first beam to the object surface without additional reflection of the first beam, wherein
    said diffractive optical device is arranged to 1) receive the second beam from said beam splitter, and 2) direct the second beam towards the object surface without additional reflection of the second beam.

4. An interferometer as defined in claim 3, wherein said diffractive optical device comprises one of a reflective grating and a hologram.

5. An interferometer as defined in claim 3, wherein said diffractive optical device is substantially parallel to said beam splitter non-diffractive optical element.

6. An interferometer as defined in claim 3, further comprising an attenuating filter which is disposed between said beam splitter and the object surface and which is arranged to attenuate the first beam.

7. An interferometer as defined in claim 3, wherein said optical assembly further comprises:
    a second diffractive optical device which is arranged to receive the first beam from the object surface and to deflect the first beam; and
    a second beam splitter which is arranged to 1) receive a) the first beam from said second diffractive optical device and b) the second beam from the object surface, and 2) recombine the first and second beams to form the interference pattern.

8. An interferometer as defined in claim 2, wherein said light generator comprises a high-coherence light source.

9. An interferometer as defined in claim 8, wherein said light source comprises one of a gas laser, a solid state laser, and a laser diode.

10. An interferometer as defined in claim 1, wherein said non-diffractive element is at a location along each of the first and second paths that is before the object surface and wherein said optical assembly is configured such that the first and second beams travel essentially the same distance from said non-diffractive optical element to the object surface.

11. An interferometer as defined in claim 10, wherein
    said non-diffractive optical element comprises a beam splitter which is arranged to 1) receive a beam from said light generator, and 2) split the received beam into a) a reflected beam forming the first beam and b) a transmitted beam forming the second beam, wherein
    said optical assembly further comprises 1) a first reflective device which is arranged to a) receive the first beam from said beam splitter, and b) direct the first beam onto the object surface without additional reflection of the first beam, and 2) a second reflective device which is arranged to receive the second beam from said beam splitter and to deflect the second beam, and wherein
    said diffractive optical device is arranged to a) receive the second beam from said second reflective device, and b) direct the second beam onto the object surface without additional reflection of the second beam.

12. An interferometer as defined in claim 11, wherein said first and second reflective devices both comprise mirrors.

13. An interferometer as defined in claim 11, wherein said beam splitter is a first beam splitter and said diffractive optical device is a first diffractive optical device, and wherein said optical assembly further comprises
    a third reflective device which is arranged to receive the first beam from the object surface and to deflect the first beam,
    a second diffractive optical device which is arranged to receive the second beam from the object surface and to deflect the second beam,
    a fourth reflective device which is arranged to receive the second beam from said second diffractive optical device and to additionally deflect the second beam, and
    a second beam splitter which is arranged to 1) receive a) the first beam from said third reflective device and b) the second beam from said fourth reflective device and 2) recombine the first and second beams to form the interference pattern.

14. An interferometer as defined in claim 10, wherein said light generator comprises a low-coherence light source.

15. An interferometer as defined in claim 1, further comprising an imaging device which is arranged to image the interference pattern.

16. An interferometer as defined in claim 15, wherein said imaging device comprises a charge coupled camera.

17. An interferometer as defined in claim 1, wherein said optical assembly further comprises a phase shifter which induces a periodic phase shift in light traveling through said optical assembly.

18. An interferometer as defined in claim 17, wherein said phase shifter is coupled to another component of said optical assembly and is arranged to effect periodic movement of said component.

19. An interferometer as defined in claim 18, wherein said phase shifter is coupled to said diffractive optical device.

20. An interferometer as defined in claim 1, wherein said diffractive optical device comprises one of a reflective grating and a hologram.

21. An interferometer as defined in claim 20, wherein said diffractive optical device comprises a blazed reflective grating.

22. An interferometer as defined in claim 1, wherein said diffractive optical device is substantially parallel with an adjacent component of said optical assembly.

23. An interferometer as defined in claim 1, further comprising a scanning stage which is arranged to translate the object with respect to said optical assembly so as to permit depth scanning.

24. A geometrically-desensitized interferometer for profiling an object surface, said interferometer comprising:
(A) a light generator which includes a high-coherence light source; and
(B) an optical assembly which is disposed between said light generator and the object surface and which includes
  (1) a non-diffractive beam splitter which is arranged to a) receive a beam from said light generator, b) split the received beam into i) a transmitted beam forming a first impinging beam and ii) a reflected beam forming a second impinging beam, and c) transmit the first impinging beam to the object surface without additional deflection of the first impinging beam,
  (2) a diffractive optical device which is arranged to a) receive the second impinging beam from said beam splitter and b) transmit the second impinging beam to the object surface without additional reflection of the second impinging beam, wherein said beam splitter and said diffractive optical device are configured and arranged relative to one another such that the first and second impinging beams a) propagate in two different directions, b) impinge upon the object surface at essentially the same location but at different incident angles, and c) are of substantially different lengths; and
(C) a recombining optical assembly which is arranged to recombine first and second reflected beams propagating from the object surface to form an interference pattern representative of a profile of the object surface.

25. An interferometer as defined in claim 24, wherein said beam splitter is a first beam splitter and said diffractive optical device is a first diffractive optical device, and wherein said recombining optical assembly comprises
  a second diffractive optical device which is arranged to receive the first reflected beam from the object surface and to deflect the first reflected beam, and
  a second non-diffractive beam splitter which is arranged to 1) receive a) the first reflected beam from said second diffractive optical device and b) the second reflected beam from the object surface, and 2) recombine the first and second reflected beams to form the interference pattern.

26. A geometrically-desensitized interferometer for profiling an object surface, said interferometer comprising:
(A) a light generator which includes a low-coherence light source; and
(B) an optical assembly which is disposed between said light generator and the object surface and which includes
  (1) a non-diffractive beam splitter which is arranged to a) receive a beam from said light generator, and b) split the received beam into i) a reflected beam forming a first impinging beam and ii) a transmitted beam forming a second impinging beam,
  (2) a first reflective device which is arranged to a) receive the first impinging beam from said beam splitter and b) direct the first impinging beam onto the object surface without additional reflection of the first impinging beam,
  (3) a second reflective device which is arranged to receive the second impinging beam from said beam splitter and to deflect the second impinging beam,
  (4) a diffractive optical device which is arranged to a) receive the second impinging beam from said second reflective device and b) direct the second impinging beam onto the object surface without additional reflection of the second impinging beam, wherein said beam splitter, said first and second reflective devices, and said diffractive optical device are configured and arranged relative to one another such that the first and second impinging beams a) propagate in two different directions, b) impinge upon the object surface at essentially the same location but at different incident angles, and c) are of substantially the same length; and
(C) a recombining optical assembly which is arranged to recombine first and second reflected beams propagating from the object surface to form an interference pattern representative of a profile of the object surface.

27. An interferometer as defined in claim 26, wherein said beam splitter is a first beam splitter and said diffractive optical device is a first diffractive optical device, and wherein said recombining optical assembly comprises
  a third reflective device which is arranged to receive the first reflected beam from the object surface and to deflect the first reflected beam,
  a second diffractive optical device which is arranged to receive the second reflected beam from the object surface and to deflect the second reflected beam,
  a fourth reflective device which is arranged to receive the second reflected beam from said second diffractive optical device and to additionally deflect the second reflected beam, and
  a second non-diffractive beam splitter which is arranged to 1) receive a) the first reflected beam from said third reflective device and b) the second reflected beam from said fourth reflective device and 2) recombine the first and second reflected beams to form the interference pattern.

28. A method of profiling an object surface, said method comprising:
(A) generating a beam of light;
(B) transmitting the generated beam through an optical assembly which includes at least one non-diffractive optical element and at least one diffractive optical device, wherein the transmitting step includes dividing the generated beam into first and second impinging beams which a) propagate in two different directions, and b) impinge upon the object surface at essentially the same location but at different incident angles, wherein the first impinging beam follows a first path through the optical assembly, said first path contacting both the at least one non-diffractive optical element and the at least one diffractive optical device and wherein the second impinging beam follows a second path through the optical assembly, said second path contacting the at least one non-diffractive optical element and avoiding the at least one diffractive optical device; and (C) recombining first and second reflected beams propagating from the object surface to form an interference pattern representative of a profile of the object surface.

29. A method as defined in claim 28, wherein the first and second impinging beams travel substantially different distances from said at least one non-diffractive optical element to the object surface.

30. A method as defined in claim 29, wherein the transmitting step includes
   (1) directing the generating beam from said light generator to a beam splitter forming said at least one non-diffractive optical element,
   (2) splitting the generated beam, using said beam splitter, to form a) a transmitted beam forming the first impinging beam and b) a reflected beam forming the second impinging beam,
   (3) directing the first impinging beam from said beam splitter to the object surface without additional reflection of the first impinging beam,
   (4) directing the second impinging beam from said beam splitter to said at least one diffractive optical device, and
   (5) directing the second impinging beam from said at least one diffractive optical device to the object surface without additional reflection of the second impinging beam.

31. A method as defined in claim 30, further comprising attenuating the first impinging beam.

32. A method as defined in claim 30, wherein said beam splitter is a first beam splitter and said at least one diffractive optical device is a first diffractive optical device, and wherein the recombining step comprises
   deflecting the first reflected beam using a second diffractive optical device, and
   combining, using a second beam splitter, a) the first reflected beam from said second diffractive optical device and b) the second reflected beam from the object surface.

33. A method as defined in claim 28, wherein the first and second impinging beams travel essentially the same distance from said at least one non-diffractive optical element to the object surface.

34. A method as defined in claim 33, wherein the transmitting step comprises
   (1) directing the generated beam from said light generator to a beam splitter forming said at least one non-diffractive optical element,
   (2) splitting the generating beam, using said beam splitter, to form a) a reflected beam forming the first impinging beam and b) a transmitted beam forming the second impinging beam,
   (3) directing the first impinging beam to a first reflective device,
   (4) directing the first impinging beam from the first reflective device and onto the object surface without additional reflection of the first impinging beam,
   (5) directing the second impinging beam to a second reflective device,
   (6) directing the second impinging beam from the second reflected device to a diffractive optical device which forms said at least one diffractive optical device and which is parallel to second reflective device, and
   (7) directing the second impinging beam from said diffractive optical device and onto the object surface without additional reflection of the second impinging beam.

35. A method as defined in claim 34, wherein said beam splitter is a first beam splitter and said diffractive optical device is a first diffractive optical device, and wherein the recombining step comprises
   (1) directing the first reflected beam from the object surface to a third reflective device to deflect the first reflected beam,
   (2) directing the second reflected beam from the object surface to a second diffractive optical device to deflect the second reflected beam,
   (3) directing the second reflected beam from said second diffractive optical device and to a fourth reflective device to additionally deflect the second reflected beam, and
   (4) directing, to a second beam splitter, i) the additionally deflected first reflected beam from said third reflective device and ii) the second reflected beam from said fourth reflective device, and
   (5) recombining the first and second reflected beams, using said second beam splitter, to form the interference pattern.

36. A method as defined in claim 28, further comprising imaging the interference pattern.

37. A method as defined in claim 28, further comprising inducing a periodic phase shift in light traveling through said optical assembly.

38. A method as defined in claim 37, wherein the inducing step comprises effecting periodic movement of a component of said optical assembly.

39. A method as defined in claim 38, wherein the inducing step comprises effecting periodic movement of said at least one diffractive optical device.

40. A method as defined in claim 28, wherein said at least one diffractive signal device is parallel with said at least one non-diffractive optical element and receives one of said first and second impinging beams from said at least one non-diffractive optical element.

41. A method as defined in claim 28, further comprising actuating a scanning stage which translates the object relative to said optical assembly for the purpose of depth scanning.

42. A method of profiling an object surface, comprising:
   (A) generating a beam of light using a high-coherence light source;
   (B) transmitting the generated beam through an optical assembly which includes a beam splitter and a diffractive optical device, wherein the transmitting step includes dividing the generated beam into first and second impinging beams which a) propagate in two different directions, b) impinge upon the object surface at essentially the same location but at different incident angles, c) exhibit an optical path difference therebetween that can be at least substantially independent of field position, and d) travel substantially different distances from said beam splitter to the object surface, said transmitting step including
      (1) directing the generated beam from said light generator to said beam splitter,
      (2) splitting the generated beam, using said beam splitter, to form a) a transmitted beam forming the first impinging beam and b) a reflected beam forming the second impinging beam, (3) directing the first impinging beam from said beam splitter to the object surface without additional reflection of the first impinging beam, (4) directing the second impinging beam from said beam splitter to said diffractive optical device, and (5) directing the second impinging beam from the diffractive optical device to the object surface without additional reflection of the second impinging beam; and (C) recombining first and second reflected beams propagating from the object surface to form an interference pattern representative of a profile of the object surface.

43. A method as defined in claim 42, wherein said beam splitter comprises a first beam splitter and said diffractive optical device comprises a first diffractive optical device, and wherein the recombining step comprises (1) deflecting the first reflected beam using a second diffractive optical device, and (2) combining, in a second beam splitter, a) the first reflected beam from said second diffractive optical device and b) the second reflected beam from the object surface.

44. A method profiling an object surface, comprising:

(A) generating a beam of light using a low-coherence light source;

(B) transmitting the generated beam through an optical assembly which includes a beam splitter and a diffractive optical device, wherein the transmitting step includes dividing the generated beam into first and second impinging beams which a) propagate in two different directions, b) impinge upon the object surface at essentially the same location but at different incident angles, c) exhibit an optical path difference therebetween that can be at least substantially independent of field position, and d) travel substantially the same distance from said beam splitter to the object surface, said transmitting step including (1) directing the generated beam from said light generator to said beam splitter, (2) splitting the generated beam, using said beam splitter, to form a) a reflected beam forming the first impinging beam and b) a transmitted beam forming the second impinging beam, (3) directing the first impinging beam to a first reflective device, (4) directing the first impinging beam from the first reflective device and onto the object surface without additional reflection of the first impinging beam, (5) directing the second impinging beam to a second reflective device, (6) directing the second impinging beam from the second reflected device to a diffractive optical device which is parallel to said second reflective device, and (7) directing the second impinging beam from said diffractive optical device and onto the object surface without additional reflection of the second impinging beam; and (C) recombining first and second reflected beams at the second beam splitter to form an interference pattern representative of a profile of the object surface.

45. A method as defined in claim 44, wherein said beam splitter comprises a first beam splitter and said diffractive optical device comprises a first diffractive optical device, and wherein the recombining step comprises (1) directing the first reflected beam from the object surface to a third reflective device to deflect the first reflected beam, (2) directing the second reflected beam from the object surface to a second diffractive optical device to deflect the second reflected beam, (3) directing the second reflected beam from said second diffractive optical device and to a fourth reflective device to additionally deflect the second reflected beam, (4) directing, to a second beam splitter, i) the additionally deflected first reflected beam from said third reflective device and ii) the second reflected beam from said fourth reflective device, and (5) recombining the first and second reflected beams, using said second beam splitter, to form the interference pattern.

46. A geometrically-desensitized interferometer for profiling an object surface, said interferometer comprising:

(A) a light generator which generates first and second impinging beams which a) propagate in two different directions, and b) impinge upon the object surface at essentially the same location but at different incident angles to produce first and second reflecting beams, respectively; and (B) an optical assembly positioned to receive the first and second reflecting beams from the object surface, said optical assembly including a non-diffractive optical element and a diffractive optical device, and which is arranged to recombine the first and second reflecting beams from the object surface to form an interference pattern representative of a profile of the object surface, wherein the first reflecting beam follows a first path through the optical assembly, said first path including both the non-diffractive optical element and the diffractive optical device and wherein the second reflecting beam follows a second path through the optical assembly, said second path including the non-diffractive optical element and excluding the diffractive optical device.

47. An interferometer as defined in claim 46, wherein said non-diffractive optical element comprises a beam splitter and wherein said diffractive optical device is arranged to receive the first reflecting beam from the object surface and to deflect the first reflecting beam, and wherein said beam splitter is arranged to 1) receive a) the first reflecting beam deflected from said diffractive optical device and b) the second reflecting beam from the object surface, and 2) recombine the first and second reflecting beams to form the interference pattern.

48. An interferometer as defined in claim 47, wherein said non-diffractive optical element is a beam splitter, wherein said diffractive optical device is arranged to receive the second reflecting beam from the object surface and to deflect the second reflecting beam, wherein said optical assembly further comprises a first reflective device which is arranged to receive the first reflecting beam from the object surface and to deflect the first reflecting beam, and a second reflective device which is arranged to receive the second reflecting beam from the diffractive element and to deflect the second reflecting beam, and wherein said beam splitter is arranged to 1) receive a) the first reflecting beam from said first reflective device and b) the second reflecting beam from said second reflective device and 2) recombine the first and second reflecting beams to form the interference pattern.

49. An interferometer as defined in claim 46, wherein said optical assembly is configured such that the first and second reflecting beams travel substantially different distances from said object surface to said non-diffractive optical element.

50. An interferometer as defined in claim 46, wherein said optical assembly is configured such that the first and second reflecting beams travel substantially the same distance from said object surface to said non-diffractive optical element.

* * * * *